(12) United States Patent
Huang et al.

(10) Patent No.: US 10,559,863 B2
(45) Date of Patent: Feb. 11, 2020

(54) DYNAMIC METAL-ANODE FLOW BATTERY ENERGY-STORAGE SYSTEM

(71) Applicant: National Taipei University of Technology, Taipei (TW)

(72) Inventors: Kuohsiu David Huang, Taipei (TW); Ting-Wei Hsu, Taichung (TW); Jhang-Cheng Chen, Taipei (TW); Wei-Mon Yan, Taipei (TW)

(73) Assignee: NATIONAL TAIPEI UNIVERSITY OF TECHNOLOGY, Taipei (TW)

( * ) Notice: Subject to any disclaimer, the term of this patent is extended or adjusted under 35 U.S.C. 154(b) by 15 days.

(21) Appl. No.: 16/119,387

(22) Filed: Aug. 31, 2018

(65) Prior Publication Data

US 2019/0296410 A1  Sep. 26, 2019

(30) Foreign Application Priority Data

Mar. 23, 2018 (TW) .............................. 107109958 A

(51) Int. Cl.
*H01M 12/08* (2006.01)
*H01M 12/02* (2006.01)
*H02J 7/00* (2006.01)

(52) U.S. Cl.
CPC ........... *H01M 12/08* (2013.01); *H01M 12/02* (2013.01); *H02J 7/0013* (2013.01)

(58) Field of Classification Search
CPC ....... H02J 7/0013; H01M 12/02; H01M 12/08
USPC ....................................................... 320/128
See application file for complete search history.

(56) References Cited

U.S. PATENT DOCUMENTS

| 6,299,998 B1 * | 10/2001 | Morris | .................. | H01M 12/08 |
| | | | | 429/404 |
| 2017/0016129 A1 * | 1/2017 | Bulan | .................. | C25B 11/035 |

FOREIGN PATENT DOCUMENTS

| CN | 2736943 | * 10/2005 |
| CN | 2736943 Y | 10/2005 |

* cited by examiner

*Primary Examiner* — Nathaniel R Pelton
(74) *Attorney, Agent, or Firm* — Birch, Stewart, Kolasch & Birch, LLP

(57) ABSTRACT

A dynamic metal-anode flow battery energy-storage system includes a discharge module, a charging module, and a delivery device. The discharge module includes a plurality of discharge reactants to be oxidized to discharge electric energy. The charging module is electrically connected to the discharge module and includes at least one electrolysis device and at least one removal device. The electrolysis device includes a conductive member which is to be energized with electricity, such that a plurality of electrolysis products having the same material with the discharge reactants are adhered to a surface thereof. The removal device includes a scraper adapted to remove the adhered electrolysis products from the surface of the conductive member. The delivery device is adapted to deliver the electrolysis products into the first electrolyte as the discharge reactants, and deliver the discharged products into the second electrolyte as the electrolysis reactants.

9 Claims, 10 Drawing Sheets

DYNAMIC METAL-ANODE FLOW BATTERY ENERGY-STORAGE SYSTEM

BACKGROUND OF THE INVENTION

Technical Field

The present invention relates generally to a battery energy-storage system, and more particularly to a dynamic metal-anode flow battery energy-storage system.

Description of Related Art

After the industrial revolution, fossil fuels have become a major source of energy which human beings depend on. However, petrochemical energy will eventually be exhausted. In the future, all countries in the world will face a high oil price shock brought by the shrinking capacity of petrochemical production. Therefore, it is one of the important topics in the energy policy for the countries around the world on how to reduce the dependence on fossil fuels and to moderately use the limited energy.

In addition, with the rising awareness of environmental protection and the pursuit of sustainable development in recent years, the countries keep looking for and developing high-efficiency and low-pollution energy sources, among which metal fuel cells with high specific energy and specific power is one of the main energy sources on development.

Among the metal fuel cells, zinc fuel cells have particularly attracted people's attention because zinc is relatively stable in aqueous solutions and alkaline electrolytes. However, most of the zinc-air batteries available on the market are one-time consumables. Even though some manufacturers have tried to utilize the electrolyte in the electrolyzed zinc-air battery to reduce the zinc oxide particles contained therein as a raw material for the zinc-air battery, it is still a major problem on how to efficiently reuse the zinc material adhered on the conductive rods of the cathode.

Furthermore, it is not only too complicated for the users to take the electrolyte out of the zinc-air battery and to transfer the reduced zinc back to the zinc-air battery, but also lack of an integrated device on the market which both includes the zinc-air battery and the capability of electrolyzing zinc oxide. Hence, it is difficult to reuse the zinc particles.

BRIEF SUMMARY OF THE INVENTION

In view of the above, an object of the present invention is to provide a dynamic metal-anode flow battery energy-storage system, which can reuse fuel material such as metal particles.

According to the present invention, a dynamic metal-anode flow battery energy-storage system includes a discharge module including at least one metal-air battery which includes a plurality of discharge reactants in a first electrolyte, wherein the discharge reactants react with oxygen in air to form a plurality of discharged products and discharge electric energy; a charging module, being electrically connected to the discharge module and including at least one electrolysis device and at least one removal device, wherein the at least one electrolysis device includes a conductive member and a plurality of electrolysis reactants immersed in a second electrolyte; the electrolysis reactants are electrolyzed to form a plurality of electrolysis products which are adhered to a surface of the conductive member; the electrolysis products and the discharge reactants are of the same material; the at least one removal device includes a scraper adapted to remove the adhered electrolysis products from the surface of the conductive member; and a delivery device adapted to deliver the electrolysis products into the first electrolyte as the discharge reactants, and deliver the discharged products into the second electrolyte as the electrolysis reactants.

The advantage of the present invention is that after the discharge reactants which are used as fuel is discharged, the generated discharged products could be delivered into the second electrolyte in the electrolysis device as the electrolysis reactants to undergo an electrolysis process, and thereby to form on the conductive member with the electrolysis products which could be delivered back to the discharge module and used as the discharge reactants for the next discharging process, which achieves reusing the fuel in the system.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
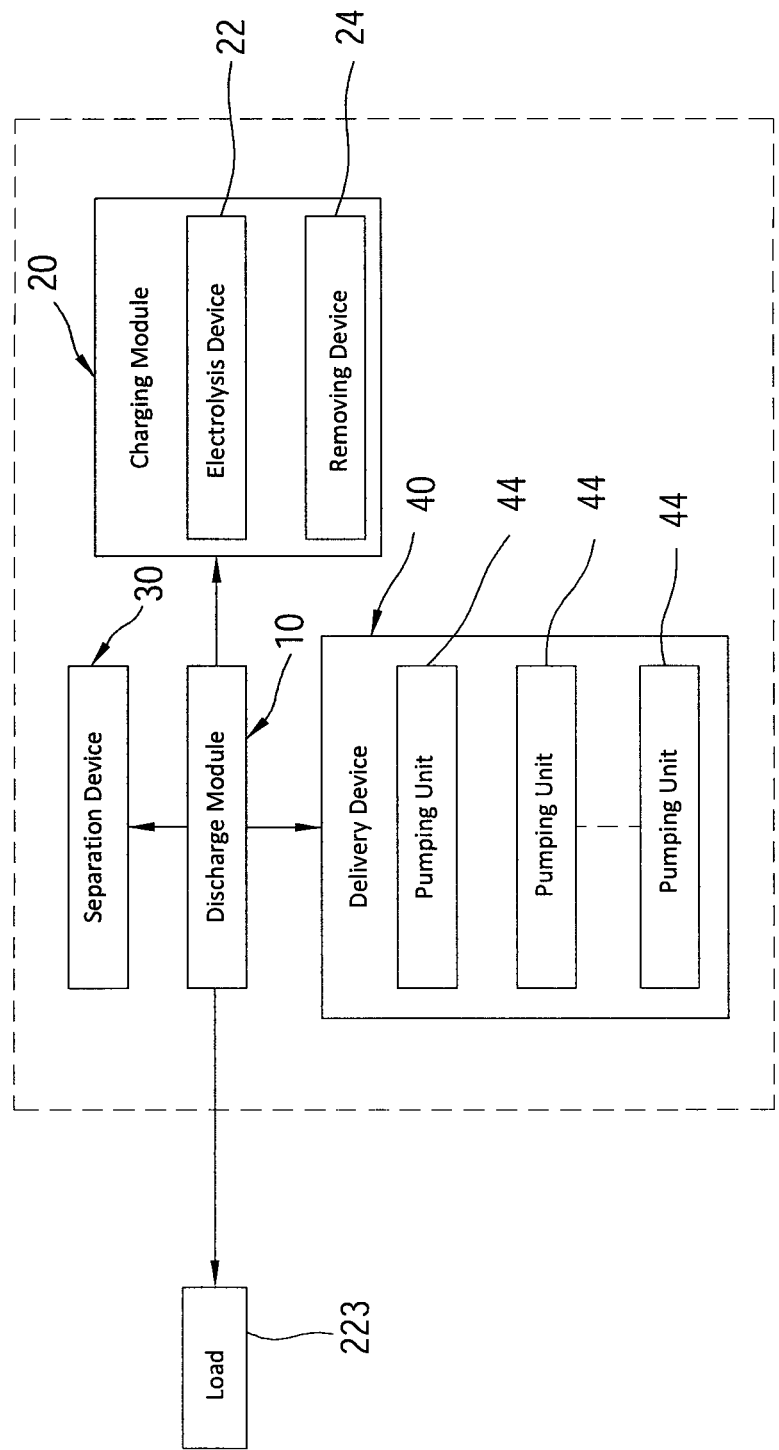
FIG. 1 is a block diagram of a dynamic metal-anode flow battery energy-storage system according to a first embodiment of the present invention.

The following illustrative embodiments and drawings are provided to illustrate the disclosure of the present invention, these and other advantages and effects can be clearly understood by persons skilled in the art after reading the disclosure of this specification. Referring to FIGS. 1 to 5, a dynamic metal-anode flow battery energy-storage system 100 according to a first embodiment of the present invention includes a discharge module 10, a charging module 20, a separation device 30, and a delivery device 40, wherein the charging module 20, the separation device 30, and the delivery device 40 are respectively, electrically connected with the discharge module 10.

The discharge module 10 has at least one metal-air battery, which includes a first reaction tank 12 for storing a first electrolyte and a plurality of discharge reactants. The detailed structure of the metal-air battery could be referred to Taiwan Patent Application Publication No. 201727981, and will not be described in detail herein. The discharge reactants are used as fuels for discharge, which react with oxygen in the air to discharge electrical energy and form a plurality of discharged products. In the current embodiment, the discharge reactants are zinc particles as an example, however, this is not a limitation of the present invention. The discharged products are zinc oxide particles.

Figure 2:
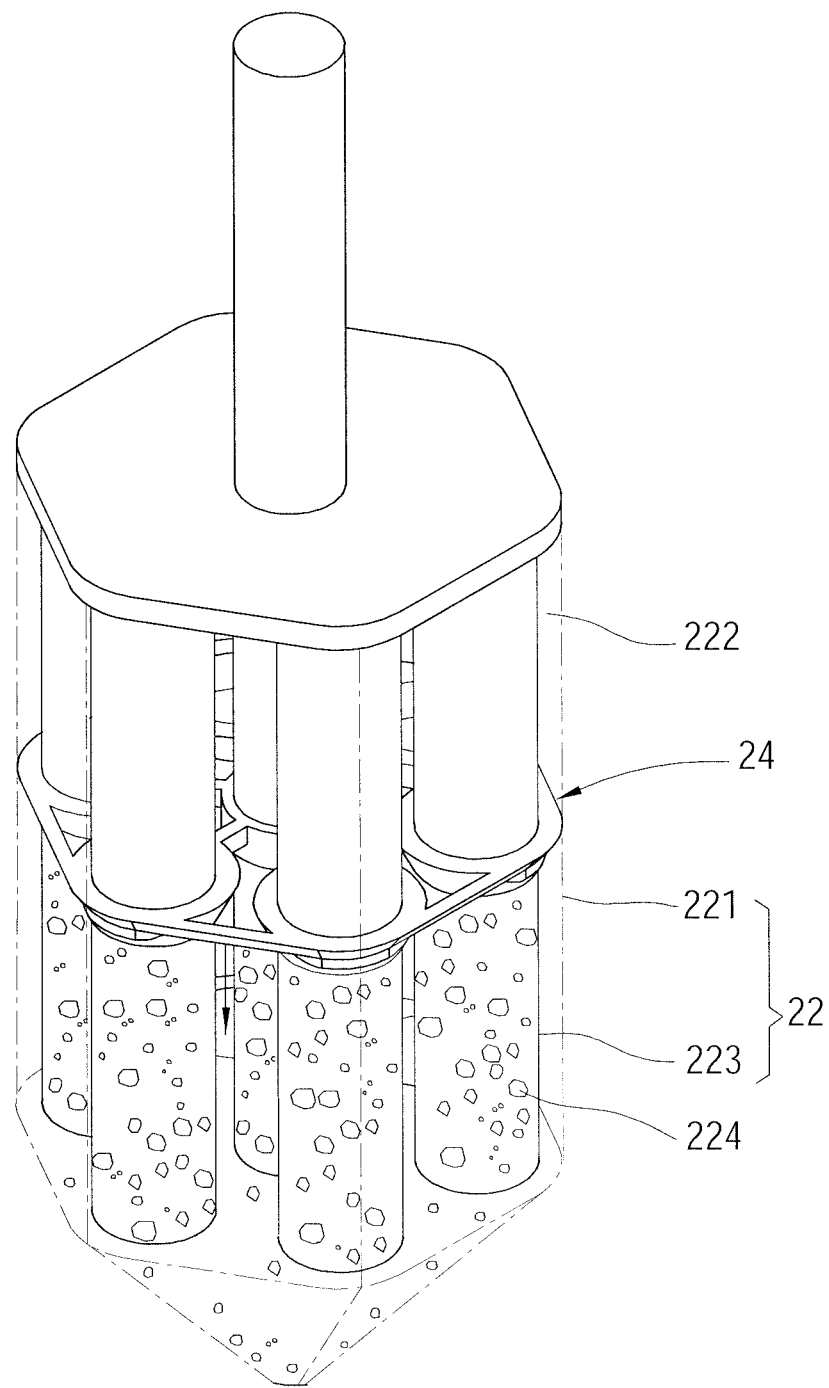
FIG. 2 is a schematic view showing partial components of the system of the first embodiment.
Figure 3:
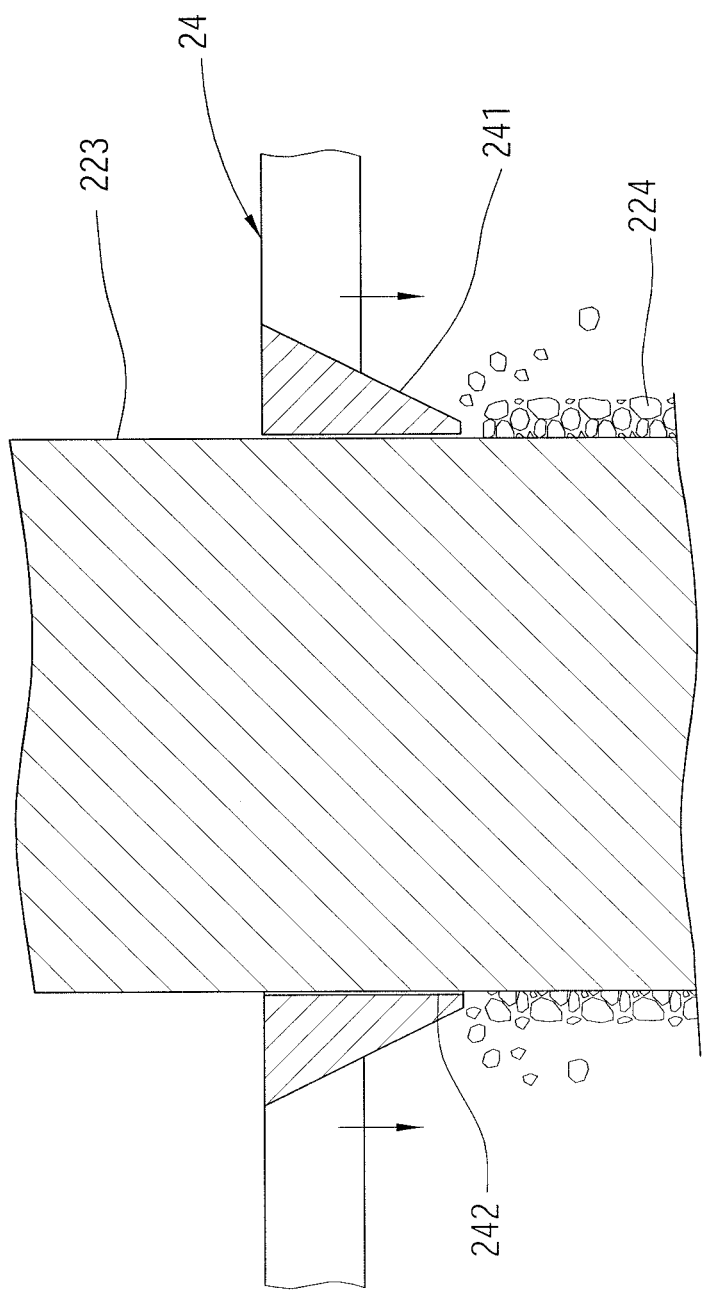
FIG. 3 is a partial cross-sectional view of the components of FIG. 2.

Referring to FIGS. 2 and 3, the charging module 20 includes at least one electrolysis device 22 and at least one removal device 24, wherein the number of the at least one electrolysis device 22 and the at least one removal device 24 are the same.

Each electrolysis device 22 includes a body 221 and a conductive member 223, wherein the body 221 has a second reaction tank 222 formed therein for storing a second electrolyte and a plurality of electrolysis reactants. In the current embodiment, the electrolysis reactants are zinc oxide particles, and the conductive member 223 is immersed in the second electrolyte. After the electrolysis device 22 is energized with electricity, the electrolysis reactants are electrolyzed to form a plurality of electrolysis products 224 which are adhered to a surface of the conductive member 223.

Each removal device 24 includes a scraper 241, wherein the scraper 241 or the conductive member 223 could be controlled to move relative to the other, so that the scraper 241 could remove away the electrolysis product 224 adhered on the surface of the conductive member 223.

In the current embodiment, the conductive member 223 has a rod shape, and the scraper 241 has a via hole 242 adapted to be passed through by the conductive member 223, wherein an edge of the via hole 242 is adjacent to the surface of the conductive member 223. Whereby, when the scraper 241 is controlled to move along an axial direction of the conductive member 223, the electrolysis product 224 on the surface of the conductive member 223 could be removed. In an alternative embodiment, the scraper 241 could abut against the conductive member 223 and the conductive member 223 is controlled to rotate such that the electrolysis products also could be removed away.

The separation device 30 is adapted to separate the discharged products from the first electrolyte in the discharge module 10, and separate the electrolysis products 224 from the second electrolyte in the charging module 20. In the current embodiment, the separation device 30 includes two separation tanks, which are respectively referred to as "a first separation tank 32" and "a second separation tank 34" in the following description.

Figure 4:
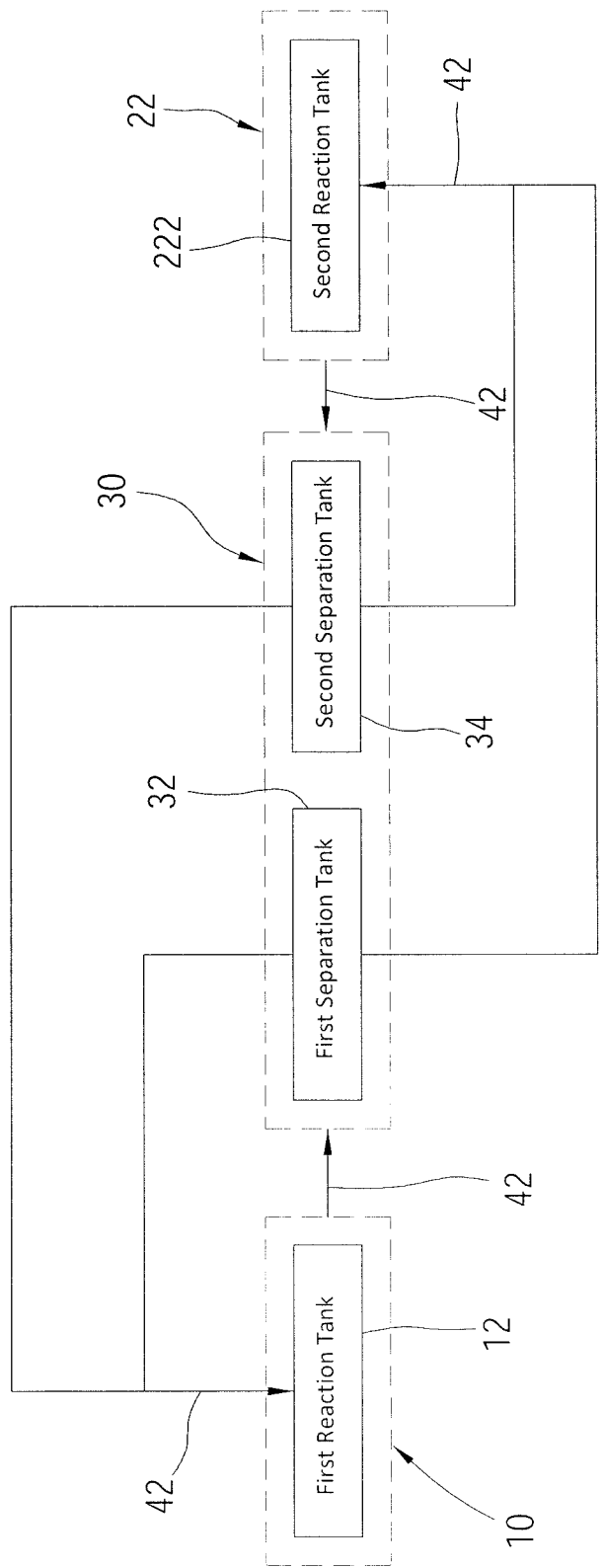
FIG. 4 is a schematic view showing a delivery pipe connection of the system of the first embodiment.

As shown in FIG. 4, the delivery device 40 is adapted to deliver the electrolysis product 224 separated from the separation device 30 to the first reaction tank 12 of the discharge module 10, and deliver the discharged products to the second reaction tank 222 of the electrolysis device 22. In addition, the delivery device 40 is also adapted to deliver the separated first electrolyte and second electrolyte to the first reaction tank 12 and the second reaction tank 222, respectively.

In the current embodiment, the delivery device 40 includes a plurality of delivery pipes 42 and a plurality of pumping units (not shown), wherein some of the delivery pipes 42 are connected at one end to the first reaction tank 12, and one another ends to the first separation tank 32 and the second separation tank 34, respectively; others of the delivery pipes 42 are connected at one end to the second reaction tank 222, and one another ends to the first separation tank 32 and the second separation tank 34, respectively; each of the pumping units is adapted to drive the electrolytes, the electrolysis products or the discharged products in the corresponding delivery pipes 42 to move from one tank to another tank.

Each component of the dynamic metal-anode flow battery energy-storage system 100 according to the first embodiment of the present invention has been described above, and the method for utilizing the same will be described hereinafter.

As shown in FIGS. 1 to 4, the discharge module 10 supplies power to a load 1, the charging module 20, the separation device 30, and the pumping units of the delivery device 40 depending on the requirements. The discharged products generated by a discharging process of the discharge module 10 are delivered together with the first electrolyte to the first separation tank 32 by the delivery pipe 42, and the separation device 30 separates the discharged products from the first electrolyte. The first electrolyte is delivered back to the first reaction tank 12 by the delivery pipe 42, while the discharged products are delivered to the second reaction tank 222 by another delivery pipe 42 to be mixed with the second electrolyte so as to form the electrolysis reactants.

The electrolysis reactants are electrolyzed to form a plurality of electrolysis products which are adhered to the surface of the conductive member. The electrolysis products are removed by the scraper 241 and then delivered together with the second electrolyte to the second separation tank 34 by the delivery device 40. The electrolysis products are separated from the second electrolyte by the second separation tank 34. After the separation, the second electrolyte is delivered back to the second reaction tank 222, while the electrolysis products are delivered back to the discharge module 10 to be mixed with the first electrolyte in the first reaction tank 12 such that the electrolysis products could be used as fuel in the next discharge procedure.

With the above design, the dynamic metal-anode flow battery energy-storage system 100 not only achieve a rapid charging and discharge effect, but also could reuse the fuel in a closed system and extend a service life thereof.

Figure 5:
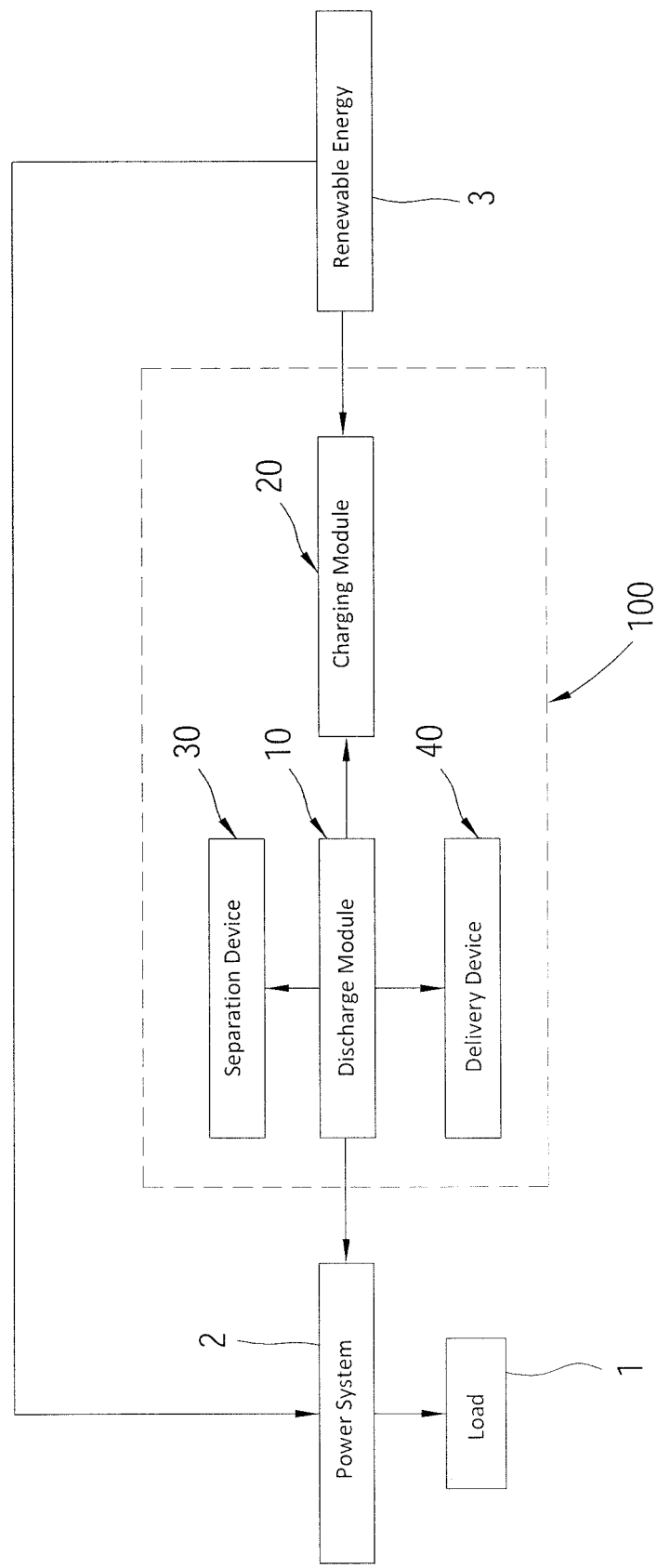
FIG. 5 is a block diagram of another dynamic metal-anode flow battery energy-storage system according to a second embodiment of the present invention.

As shown in FIG. 5, the discharge module 10 also could be electrically connected to the load 1 via a power system 2, and the charging module 20 could be electrically connected to a renewable energy source 3, however, this is not a limitation of the present invention. When a power supply provided by the renewable energy source 3 is greater than a power consumption of the load 1, a remaining power of the renewable energy source 3 could be used to electrolyze the electrolysis reactants such that the electrolysis products generated by the electrolysis could be used to supply power to the load 1 during peak hours. Whereby, it not only could store electric power but also increase green power production, which expedites cost amortization. In addition, during peak hours, the renewable energy source 3 and the discharge module 10 both could supply power to the power system 2, thereby lowering the overload and trip-off risk of the power system 2.

Figure 6:
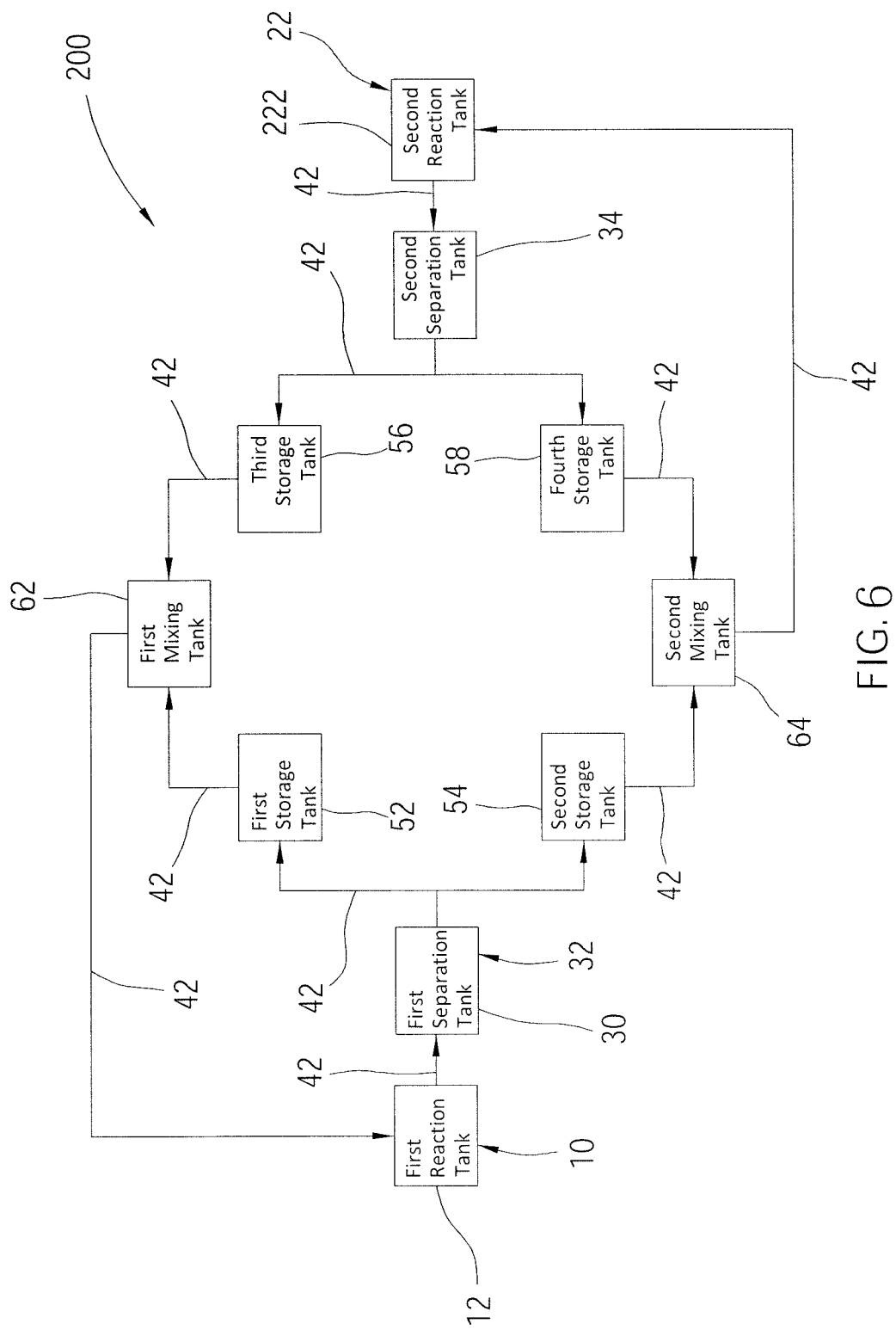
FIG. 6 is a schematic view showing a delivery pipe connection of the system of the second embodiment.

As shown in FIG. 6, a dynamic metal-anode flow battery energy-storage system 200 of a second embodiment according to the present invention further includes four storage tanks and a mixing device, which enables the electrolysis product 224 and the discharged products to be respectively delivered to the first reaction tank 12 and the second reaction tank 222 by the delivery device 40 more efficiently.

More specifically, the first separation tank 32 communicates with the first reaction tank 12 of the discharge module 10 and two of the storage tanks (hereinafter referred to as a first storage tank 52 and a second storage tank 54 respectively) via corresponding delivery pipes 42; the second separation tank 34 communicates with the second reaction tank 222 of the charging module 20 and the other two storage tanks (hereinafter referred to as a third storage tank 56 and a fourth storage tank 58 respectively) via corresponding delivery pipes 42.

After the first electrolyte and the discharged products in the first reaction tank 12 are delivered to the first separation tank 32 by the delivery pipe 42 and are separated from each other, the first electrolyte is delivered to the first storage tank 52 and stored therein, while the discharged products are delivered to the second storage tank 54 and stored therein. Similarly, after being separated, the electrolysis products 224 and the second electrolyte in the second separation tank 34 are delivered to and stored into the third storage tank 56 and the fourth storage tank 58, respectively.

The mixing device includes two mixing tanks, hereinafter referred to as a first mixing tank 62 and a second mixing tank 64. The first mixing tank 62 communicates with the first storage tank 52, the third storage tank 56 and the first reaction tank 12 via corresponding delivery pipes 42. The first mixing tank 62 is adapted to mix the first electrolyte and the electrolysis products 224 uniformly, and then the mixed first electrolyte and electrolysis products 224 is delivered back to the first reaction tank 12 by the delivery device 40. The second mixing tank 64 communicates with the second storage tank 54, the fourth storage tank 58 and the second reaction tank 222 via corresponding delivery pipes 42. The second mixing tank 64 is adapted to mix the second electrolyte and the discharged products uniformly, and then the mixed second electrolyte and the discharged products is delivered back to the second reaction tank 222 by the delivery device 40

Figure 7:
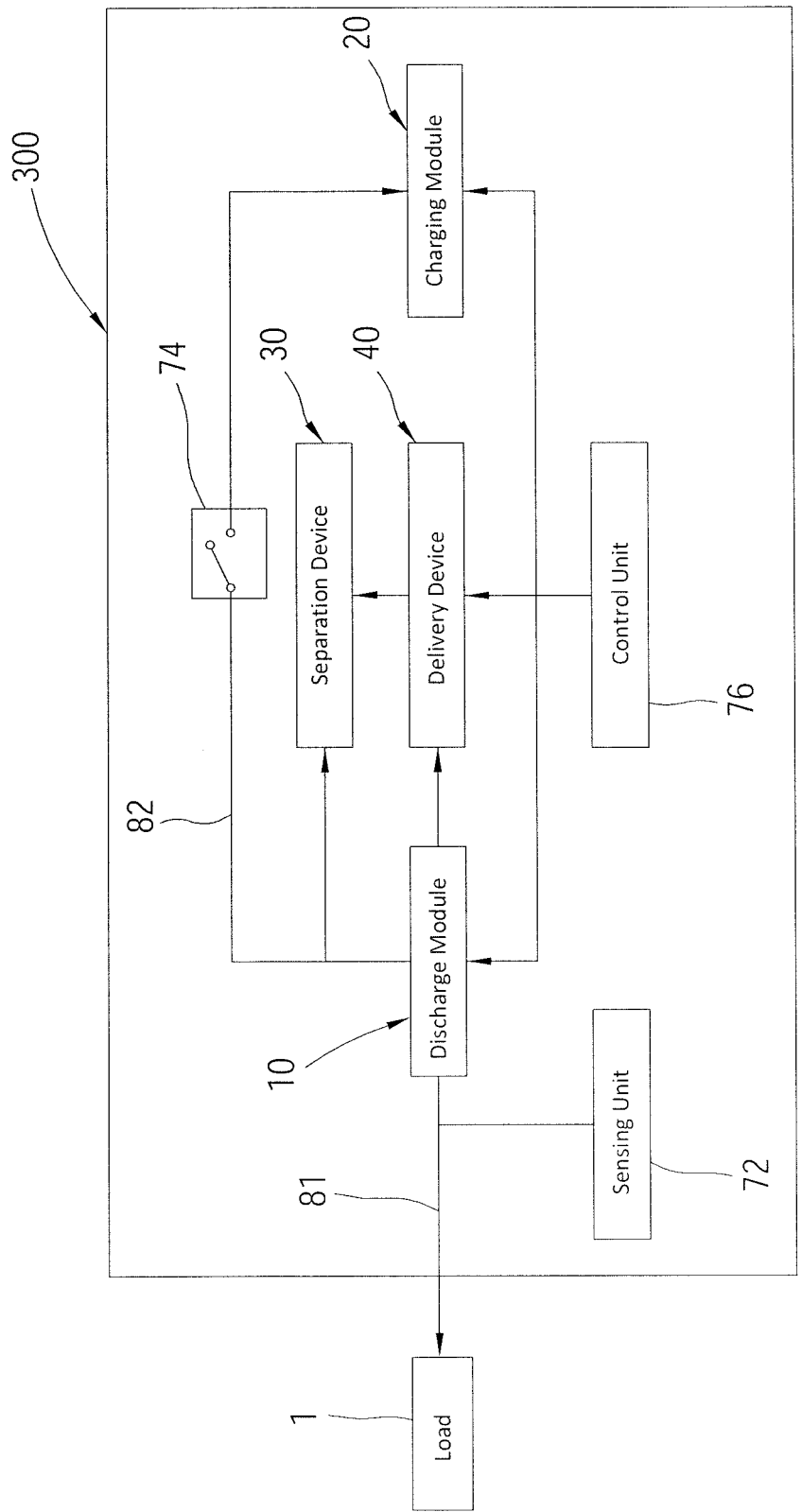
FIG. 7 is a block diagram of a dynamic metal-anode flow battery energy-storage system according to a third embodiment of the present invention.

Referring to FIG. 7, a dynamic metal-anode flow battery energy-storage system 300 according to a third embodiment of the present invention is similar to the dynamic metal-anode flow battery energy-storage system 100 of the first embodiment except that the dynamic metal-anode flow battery energy-storage system 300 further includes an energy management system 70, wherein the energy management system 70 is electrically connected to the discharge module 10, the charging module 20, the separation device 30, and the delivery device 40, wherein the discharge module 10 is electrically connected to the load 1 to form a first path 81, and the discharge module 10 is electrically connected to the charging module 20 to form a second path 82.

The energy management system 70 is adapted to control the discharge module 10 to output power to the load 1 or the charging module 20, and control a delivery amount of the electrolysis products 224 and the discharged products for the delivery device 40. The energy management system 70 includes a sensing unit 72, a switch unit 74 and a control unit 76, wherein the sensing unit 72 is electrically connected to the first path 81 and is adapted to detect a first current and a first voltage on the first path 81. The switch unit 74 is electrically connected to the second path 82. The control unit 76 is adapted to control a power output of the discharge module 10 according to a power supply of the discharge module 10 and a power consumption of the load 1.

When the first current and the first voltage detected by the sensing unit 72 is lower than a predetermined value, that is, the power output of the discharge module 10 is too low, the control unit 76 would control the switch unit 74 to be turned off to stop the discharging module 10 supplying power to the charging module 20, the separation device 30 and the delivery device 40 such that all of the power output of the discharging module 10 would be supplied to the load 1, or alternatively, the control unit 76 would control the delivery device 40 to increase the amount of the electrolysis product 224 to be delivered to the first reaction tank 12 so as to increase a power supply of the discharge module 10. Conversely, when the power output of the discharge module 10 is greater than the power required by the load 1, the control unit 76 would control the switch unit 74 to be turned on such that a remaining power of the discharge module 10 would be utilized for electrolysis, and the electrolysis product to be delivered to the first reaction tank 12 would be reduced or stopped.

With the above design, not only the fuel could be recycled, but also the power supplied to the load 1 could be adjusted depending on the requirements, whereby to sufficiently and efficiently utilize the energy.

Figure 8:
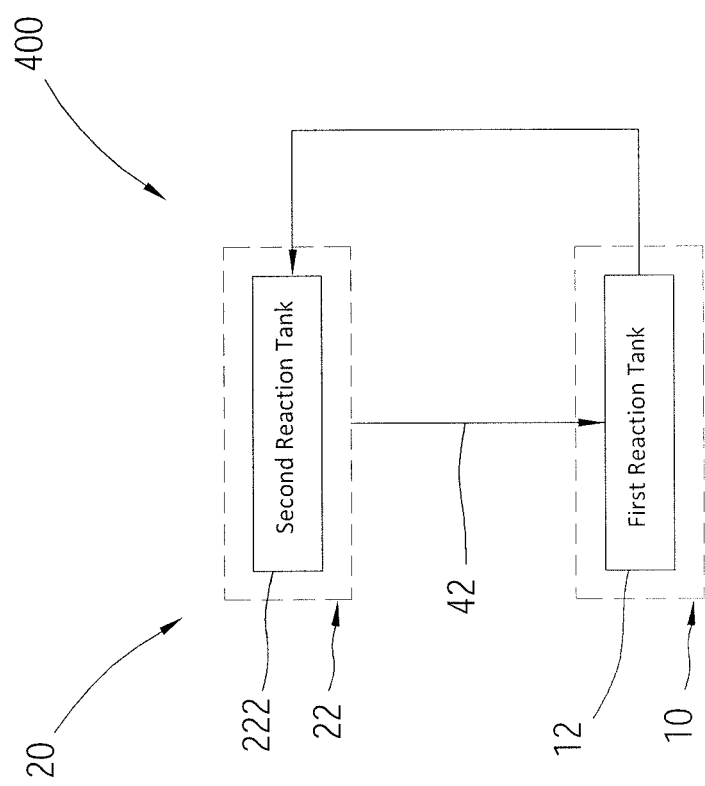
FIG. 8 is a schematic view showing a delivery pipe connection of the system of the fourth embodiment.

Referring to FIG. 8, which is a schematic diagram showing a delivery pipe connection of a dynamic metal-anode flow battery energy-storage system 400 according to a fourth embodiment of the present invention, wherein the compositions of the first electrolyte in the first reaction tank 12 and the second electrolyte in the second reaction tank 222 are the same, so that the first electrolyte and the second electrolyte are generally referred to as "electrolyte" in the following description. The charging module 20 is located above the discharge module 10 such that the electrolysis products and the electrolyte in the second reaction tank 222 could flow into the first reaction tank 12 through the delivery pipes 42 by gravity to undergo discharge reaction when there is no pumping unit and separation device provided.

Figure 9:
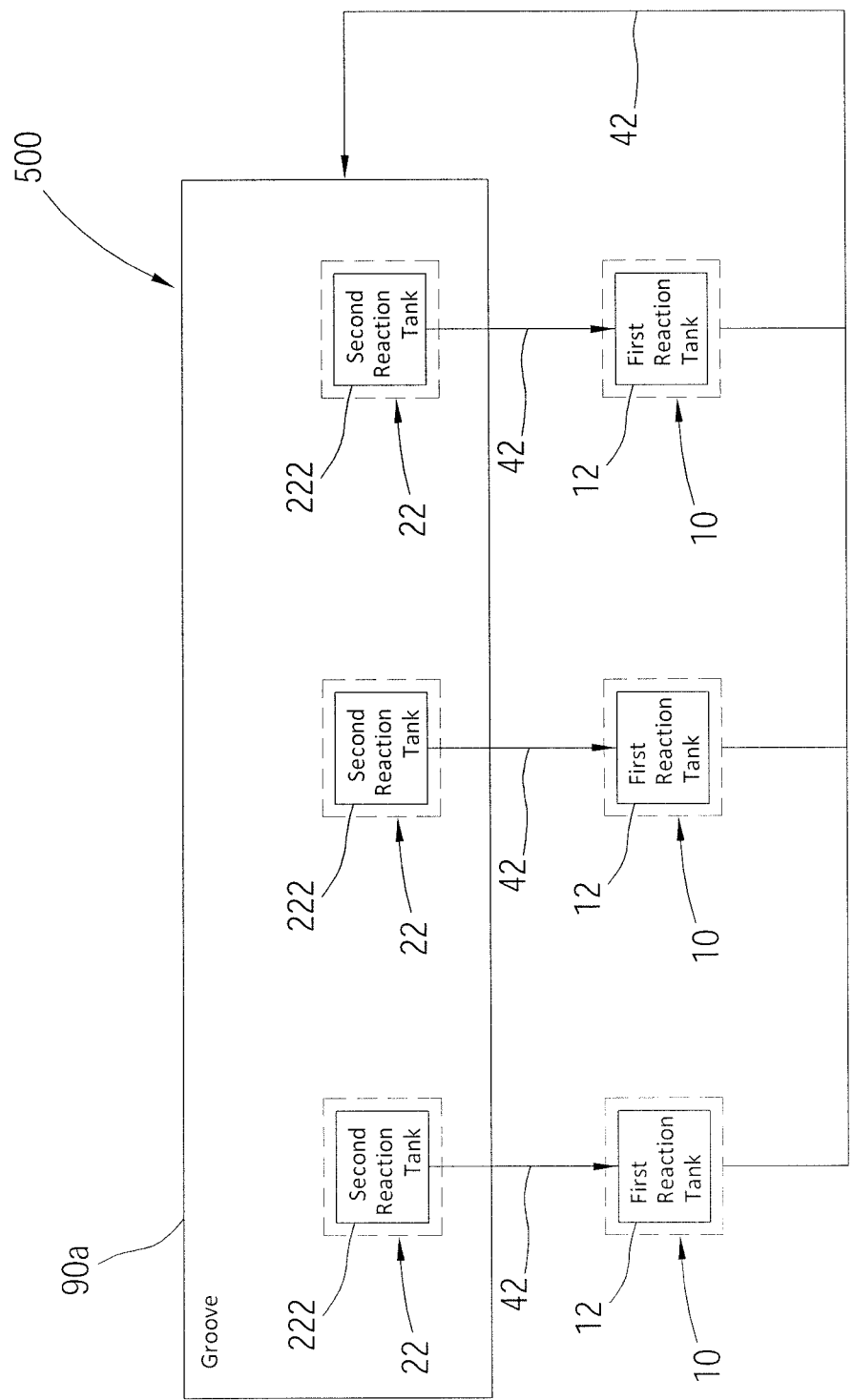
FIG. 9 is a schematic view showing a delivery pipe connection of the system of the fifth embodiment.
Figure 10:
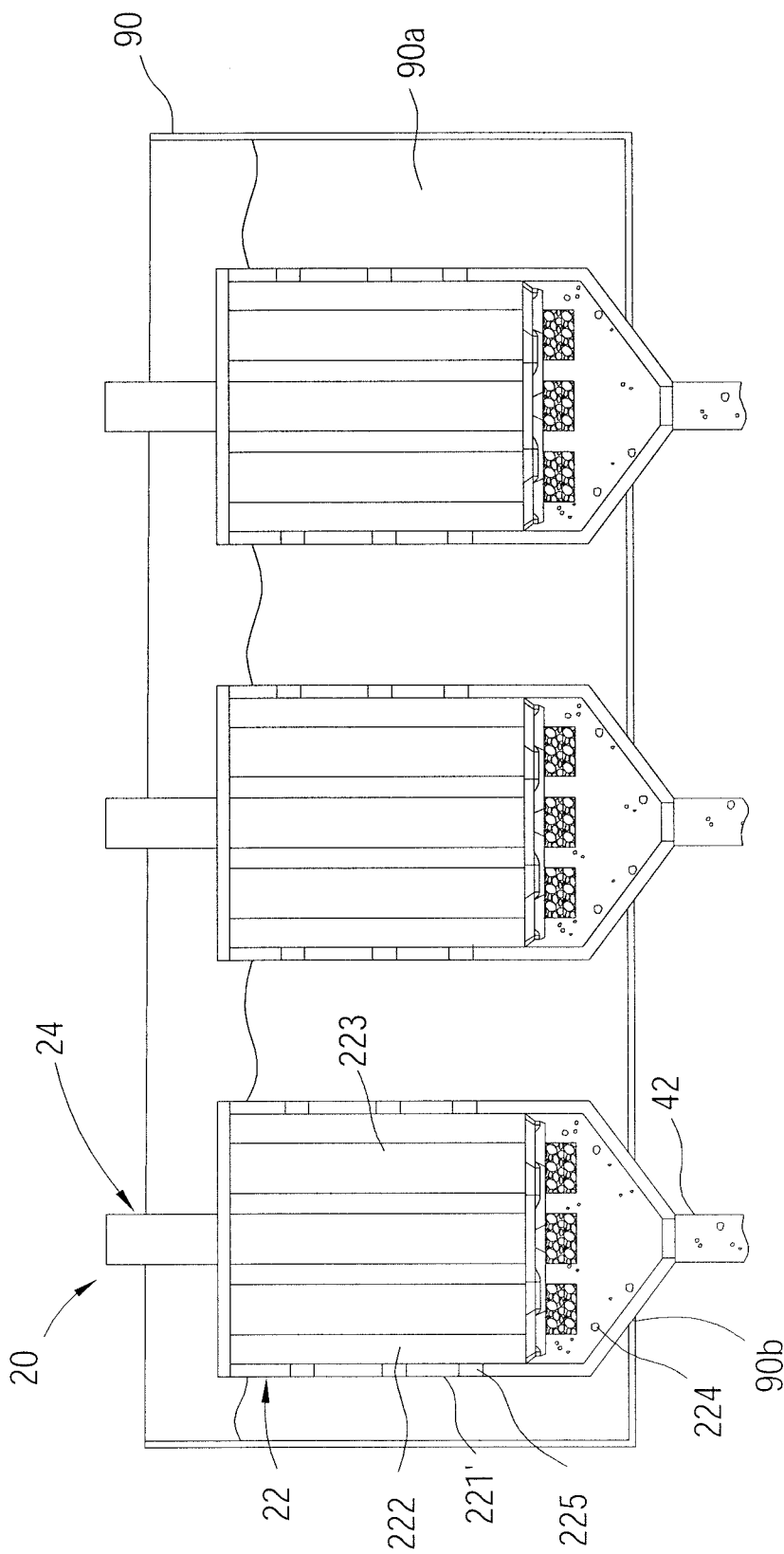
FIG. 10 is a schematic view showing partial components of the system of the fifth embodiment.

In addition, as shown in FIG. 9 and FIG. 10, a dynamic metal-anode flow battery energy-storage system 500 of a fifth embodiment according to the present invention is similar to that of the fourth embodiment, except that the dynamic metal-anode flow battery energy-storage system 500 further includes a mount 90 which is recessed with a groove 90a. At the bottom of the groove 90a is provided with a plurality of perforations 90b which communicate the groove 90a with the outside.

The bodies 221' of the plurality of the electrolysis devices 22 are disposed on the mount 90 and located in the groove 90a, and a bottom of each of the bodies 221' passes through a corresponding one of the perforations 90b. Each of the bodies 221' further includes a plurality of through holes 225 which communicate the second reaction tank 222 with the groove 90a.

Each second reaction tank 222 of the electrolysis device 22 communicates with the first reaction tank 12 of the corresponding discharge module 10 via a delivery pipeline 42 such that a power supplied to the electrolysis device 22 or a removing efficiency of the electrolysis products 224 from the surface of the conductive member 223 could be adjusted according to a power supply of the discharge module 10, whereby to control an amount of the electrolysis products 224 input into each of the first reaction tanks 12.

The discharged products generated by the discharging process in the discharge module 10 are delivered together with the electrolyte into the groove 90a via the delivery pipe 42, which also stirs the electrolyte in the groove 90a. The electrolyte and the discharged products would flow into the each of the second reaction tanks 222 via the through holes 225 to undergo electrolysis reaction.

By providing the mount 90, the bodies 221' could be fixed. In addition, since the compositions of the first electrolyte and the second electrolyte are the same, the separation device could be omitted, and thereby the cost could be reduced.

It must be pointed out that the embodiments described above are only some embodiments of the present invention. All equivalent structures which employ the concepts disclosed in this specification and the appended claims should fall within the scope of the present invention.

What is claimed is:

1. A dynamic metal-anode flow battery energy-storage system, comprising:
   a discharge module including at least one metal-air battery which includes a plurality of discharge reactants in a first electrolyte, wherein the discharge reactants react with oxygen in air to form a plurality of discharged products and discharge electric energy;
   a charging module, being electrically connected to the discharge module and including at least one electrolysis device and at least one removal device, wherein the at least one electrolysis device includes a conductive member and a plurality of electrolysis reactants immersed in a second electrolyte; the electrolysis reactants are electrolyzed to form a plurality of electrolysis products which are adhered to a surface of the conductive member; the electrolysis products and the discharge reactants are of the same material; the at least one removal device includes a scraper adapted to remove the adhered electrolysis products from the surface of the conductive member; and
   a delivery device adapted to deliver the electrolysis products into the first electrolyte as the discharge reactants, and deliver the discharged products into the second electrolyte as the electrolysis reactants.

2. The system of claim 1, further comprising an energy management system, wherein the energy management system is electrically connected to the discharge module, the charging module, and the delivery device; the energy management system is adapted to control the discharge module to output power to a load or the charging module, and control an amount of the discharged products delivered by the delivery device.

3. The system of claim 2, wherein the discharge module is electrically connected to the load to form a first path, and the discharge module is electrically connected to the charging module to form a second path; the energy management system includes a sensing unit, a switch unit and a control unit, wherein the sensing unit is electrically connected to the first path to detect a first current and a first voltage on the first path; the switch unit is electrically connected to the second path; the control unit is adapted to control a power output of the discharge module according to a power supply of the discharge module and a power consumption of the load; the control unit controls the switch unit to be turned off or controls the delivery device to increase the amount of the electrolysis product to be delivered to the first electrolyte when the first current and the first voltage detected by the sensing unit is lower than a predetermined value.

4. The system of claim 1, wherein the discharge reactants and the electrolysis products include a zinc-based material.

5. The system of claim 1, wherein the conductive member has a rod shape; the scrapper has a via hole adapted to be passed through by the conductive member; the scrapper is controllable to move along an axial direction of the conductive member.

6. The system of claim 1, further comprising a separation device adapted to separate the discharged products from the first electrolyte, and separate the electrolysis products from the second electrolyte.

7. The system of claim 6, further comprising two storage tanks which are respectively adapted to store the discharged products and the electrolysis products separated from the separation device.

8. The system of claim 6, further comprising a mixing device adapted to mix the first electrolyte and the electrolysis products separated from the separation device, and mix the second electrolyte and the discharged products separated from the separation device.

9. The system of claim 8, further comprising four storage tanks which are respectively adapted to store the first electrolyte, the discharged products, the second electrolyte, and the electrolysis products; the mixing device includes two mixing tanks, wherein one of the mixing tanks communicates with the storage tanks which are stored with the first electrolyte and the electrolysis products; another one of the mixing tanks communicates with the storage tanks which are stored with the second electrolyte and the discharged products.

* * * * *